(12) United States Patent
Chen et al.

(10) Patent No.: US 6,859,466 B1
(45) Date of Patent: Feb. 22, 2005

(54) PHYSICAL LAYER HEADER FOR PACKET DATA

(75) Inventors: Xiang Chen, Gaithersburg, MD (US); Anthony Noerpel, Lovettsville, VA (US); Enrique Laborde, Gaitherburg, MD (US); David Roos, Boyds, MD (US)

(73) Assignee: Hughes Electronics Corporation, El Segundo, CA (US)

( * ) Notice: Subject to any disclaimer, the term of this patent is extended or adjusted under 35 U.S.C. 154(b) by 894 days.

(21) Appl. No.: 09/707,362

(22) Filed: Nov. 7, 2000

Related U.S. Application Data (60) Provisional application No. 60/186,053, filed on Feb. 29, 2000.

(51) Int. Cl.[7] .................................................. H04J 3/06
(52) U.S. Cl. ......................... 370/509; 370/350; 370/315
(58) Field of Search ............................... 370/392, 349, 370/328, 332, 464–469, 474, 486–490, 497, 509–510; 455/12.1, 17, 102; 375/261, 340

(56) References Cited

U.S. PATENT DOCUMENTS

| | | | |
|---|---|---|---|
| 6,259,744 B1 * | 7/2001 | Lee et al. ..................... | 375/264 |
| 6,330,288 B1 * | 12/2001 | Budka et al. ................ | 375/296 |
| 6,400,928 B1 * | 6/2002 | Khullar et al. ............ | 455/67.11 |
| 6,400,954 B1 * | 6/2002 | Khan et al. .................. | 455/450 |
| 6,407,993 B1 * | 6/2002 | Moulsley .................... | 370/347 |
| 6,456,627 B1 * | 9/2002 | Frodigh et al. ............. | 370/465 |
| 6,567,375 B2 * | 5/2003 | Balachandran et al. ..... | 370/204 |
| 2001/0018770 A1 * | 8/2001 | Eryurtlu et al. ............... | 725/91 |

FOREIGN PATENT DOCUMENTS

| EP | 001126717 A1 * | 9/2001 | ............ H04N/7/24 |
|---|---|---|---|

* cited by examiner

*Primary Examiner*—Tri H. Phan
(74) *Attorney, Agent, or Firm*—John T. Whelan (57) ABSTRACT

An approach for is provided for adapting to a variety of link propagation conditions is disclosed. A source terminal generates a packet data burst that includes a header and an optional payload. The header is modulated using a default modulation scheme and is coded using a default coding scheme. A switch is configured to receive and to forward the packet data burst. A destination terminal is configured to demodulate the header using the default modulation scheme and the default coding scheme, and to examine the header to determine a particular coding scheme and a particular modulation scheme associated with the payload. The protocol can be applied to any radio communication system, particularly, to a satellite communication system with multiple satellite terminals.

9 Claims, 5 Drawing Sheets

PHYSICAL LAYER HEADER FOR PACKET DATA

This application claims priority under 35 U.S.C. § 119(c) from U.S. Provisional Application No. 60/186,053, filed Feb. 29, 2000, the entire contents of which are hereby incorporated by reference herein.

BACKGROUND OF THE INVENTION

Field of the Invention

The present invention relates to communication systems, and is more particularly related to communication protocols.

DISCUSSION OF THE BACKGROUND

Modern satellite communication systems provide a pervasive and reliable infrastructure to distribute voice, data, and video signals for global exchange and broadcast of information. These satellite communication systems have emerged as a viable option to terrestrial communication systems. Another popular application is direct television broadcasting, which has provided a competitive alternative to cable television systems. Irrespective of the application, a satellite communication system must be designed to support the largest possible traffic capacity, which can translate to lower cost per telephone circuit, or television service, for example, and thus, to increased revenue for the system operator. Capacity is largely limited by the transmission power of the satellite. The required transmission power is influenced, in part, by the link propagation conditions associated with the numerous satellite terminals (STs).

Satellite terminals experience diverse link propagation conditions, which are dictated, for example, by weather and location of the terminals within the coverage area. Because link propagation conditions are influenced by weather, these conditions are inherently dynamic. That is, at different points in time, the same terminal may require a greater link margin to maintain a communication session with the same quality of service. In practical systems, this need to maintain the same quality of service may entail use of different coding schemes and modulation schemes to combat the effects of poor link propagation conditions.

Satellite communication systems also face the challenge of maintaining proper message timing, as the satellite travel in geosynchronous orbit. To minimize timing errors, messages that are transmitted from the satellite to the terminals need to be synchronized. Synchronization errors may result in corrupted or loss data.

Based on the foregoing, there is a clear need for improved approaches for adjusting the modulation and coding schemes to adapt to the varying link propagation conditions of the terminals. There is also a need to maintain proper synchronization. Therefore, an approach for dynamically adapting to a variety of link propagation conditions in a communication system is highly desirable.

SUMMARY OF THE INVENTION

According to one aspect of the invention, a method is provided for adapting to a variety of link propagation conditions in a communication system. The method includes generating a packet data burst that includes a header and an optional payload, the header being modulated using a default modulation scheme and coded using a default coding scheme. In addition, the method encompasses transmitting the header to a plurality of terminals and demodulating the packet data burst by the plurality of terminals using the default modulation scheme and the default coding scheme. Further, the method includes examining the header to determine a particular coding scheme and a particular modulation scheme associated with the payload. This approach provides the ability to multiplex traffic from terminals with different transmission capabilities and/or link margin requirements.

According to another aspect of the invention, a communication system for adapting to a variety of link propagation conditions comprises a source terminal that is configured to generate a packet data burst that includes a header and an optional payload. The header is modulated using a default modulation scheme and is coded using a default coding scheme. A switch is configured to receive and to forward the packet data burst. A destination terminal is configured to demodulate the header using the default modulation scheme and the default coding scheme, and to examine the header to determine a particular coding scheme and a particular modulation scheme associated with the payload. The above arrangement advantageously provides synchronization of packets.

In yet another aspect of the invention, a computer-readable medium carrying one or more sequences of one or more instructions for adapting to a variety of link propagation conditions in a communication system is disclosed. The one or more sequences of one or more instructions include instructions which, when executed by one or more processors, cause the one or more processors to perform the step of generating a packet data burst that includes a header and an optional payload. The header is modulated using a default modulation scheme and is coded using a default coding scheme. Another step includes transmitting the packet data burst to a plurality of terminals, wherein the header is demodulated by the plurality of terminals using the default modulation scheme and the default coding scheme. The header specifies a particular coding scheme and a particular modulation scheme associated with the payload. This approach advantageously saves transmission power.

In yet another aspect of the invention, a memory for storing information that assists with adapting to a variety of link propagation conditions in a communication system, comprises a data structure that includes a guard band, a unique word field that provides burst synchronization, a payload, and a header field. The header field comprises a payload modulation field that specifies a particular modulation scheme, a coding scheme field that specifies a particular coding scheme, and a cyclic redundancy check (CRC) field. Accordingly, the above approach advantageously provides adaptability to varying link conditions of the terminals.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

In the following description, for the purpose of explanation, specific details are set forth in order to provide a thorough understanding of the invention. However, it will be apparent that the invention may be practiced without these specific details. In some instances, well-known structures and devices are depicted in block diagram form in order to avoid unnecessarily obscuring the invention.

The present invention provides the capability to multiplex traffic originating from a multitude of terminals with different transmission capabilities and/or different link margins over the same physical resource (i.e., traffic channel). A source terminal generates a packet data burst that includes a header and an optional payload. The header is modulated using a default modulation scheme and is coded using a default coding scheme by the source terminal. A switch receives the generated packet data burst and forwards the packet data burst to a destination terminal that demodulates the packet data burst using the default modulation scheme and the default coding scheme. The destination terminal then examines the header to determine particular coding and modulation schemes associated with the payload. Additionally, the destination may be a base station, which demodulates the packet data burst.

Although the present invention is discussed with respect to a satellite communication system, any radio communication systems, in general, are applicable.

Figure 1:
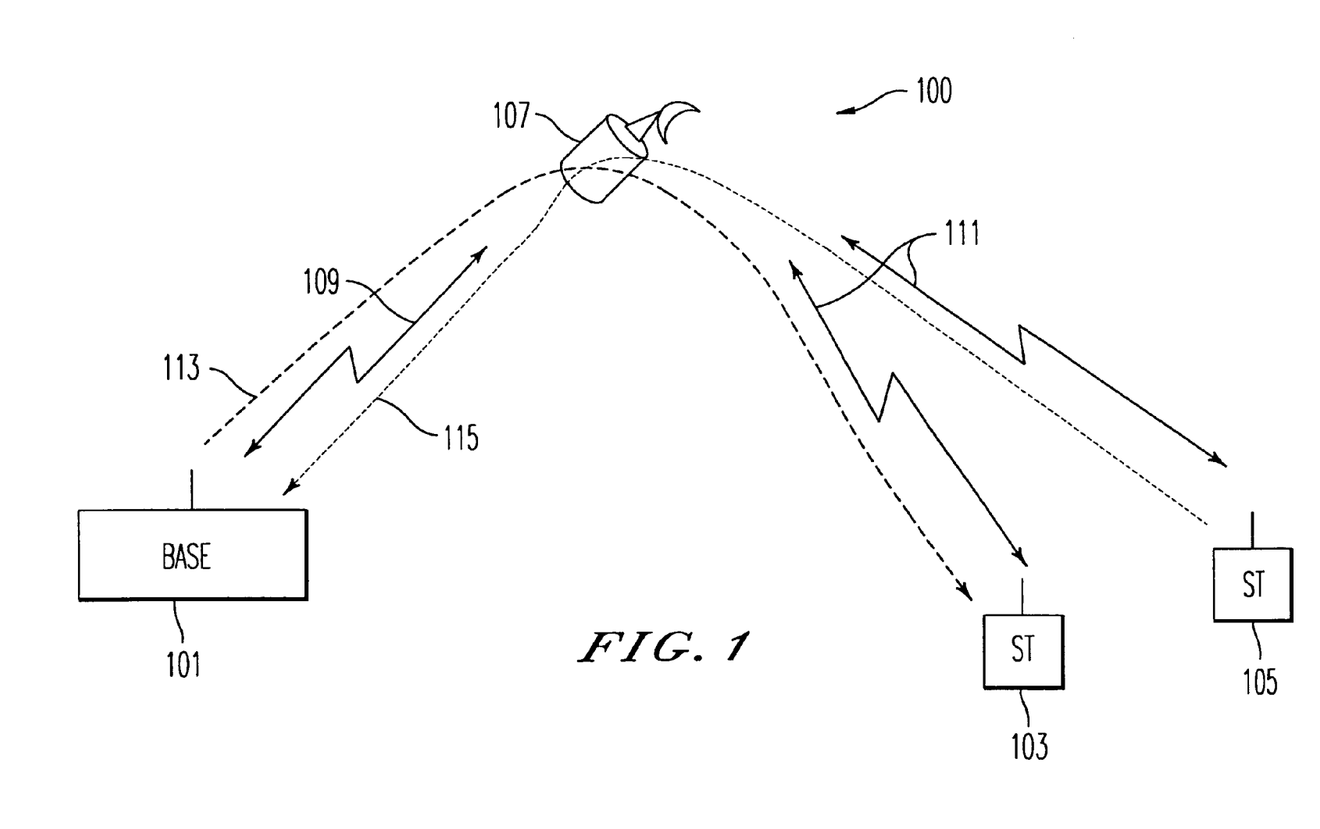
FIG. 1 is a diagram of a satellite communication system employing packet data bursts, according to an embodiment of the present invention.

FIG. 1 shows a diagram of a satellite communication system employing packet data bursts, according to an embodiment of the present invention. A satellite communication system 100 includes a base station 101 (or gateway station) that communicate with satellite terminals (STs) 103 and 105 through satellite 107. Although not shown, base station 101 may employ an ST of its own to communicate with the satellite 107. In an exemplary embodiment, uplink 109 is at C-band (4–8 GHz) and downlink 111 is at L-band (1–2 GHz). For the purposes of explanation, a convention is adopted whereby the communication path from base station 113 to the satellite 107 down to an ST, which in this example is ST 103, is denoted as the downlink. Conversely, a communication path 115 from ST 105 up to the satellite 107 and down to the base station 101 is referred to as the uplink. In an exemplary embodiment, satellite 107 contains a switch to forward received packet data bursts. The switch may be a frame-based or cell-based switch. The packet data burst formats differ depending on whether the transmission is uplink or downlink, as will be more fully discussed with respect to FIGS. 4 and 5.

Although not shown, the satellite communication system 100 may support connectivity to a public switch telephone network (PSTN) and/or a public land mobile network (PLMN) to permit the STs 103 and 105 to communicate with various terrestrial systems via the base station 101.

The STs 103 and 105 provide the subscriber interface to the system 100. The terminal types may include hand held, vehicular, and stationary units. Hand held terminals resemble traditional ground cellular units, which vehicular terminals include, for example, handsets that are docked to an external antenna, transmit power booster, and DC power source. Stationary terminals are equipped with directional antennas and can be configured to support a number of voice and data circuits.

The gateway station 101 manages and allocates system communication resources that are necessary to support the communication traffic within their respective service areas, such as L-band spectrum and downlink EIRP (Effective Isotropically Radiated Power). For example, the gateway station 101 can provide the following functions: management of the call set-up and tear down, generation of call records, allocation of communication resources within its service area (frequency and power), user authentication, and support of user roaming within the system coverage area.

The downlink is shared between STs 103 and 105 using TDMA (Time Division Multiple Access)/FDMA (Frequency Division Multiple Access). In practical systems, the STs 103 and 105 may experience different link propagation conditions; for example, ST 103 may be within a line of site, while ST 105 may be experiencing significant fading. Accordingly, these STs 103 and 105 necessarily require different link margins for a given quality of service. To address these varying requirements, the STs 103 and 105 utilize different modulation and coding schemes to adapt to the specific link propagation conditions. For example, with a relatively good link propagation condition, 16-QAM (quadrature amplitude modulation) can be used; in contrast, a poor link propagation condition require the use of $\pi/4$ QPSK (quadrature phase shift keying), or even BPSK (binary phase shift keying). To effect this adaptation, a physical layer header that specifies the coding and modulation schemes for a particular payload is used in the packet data burst. These coding and modulations schemes are more fully discussed with respect to FIG. 3.

Figure 2:
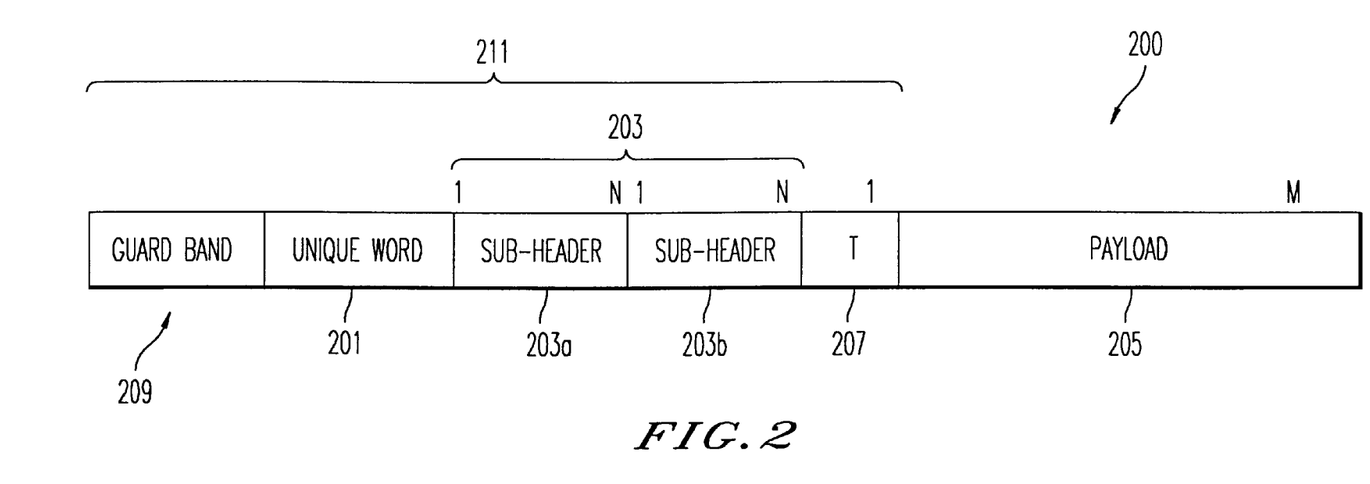
FIG. 2 is a diagram of a packet data burst that includes a physical layer header, in accordance with embodiment of the present invention.

FIG. 2 shows the format of a packet data burst that includes a physical layer header, in accordance with an embodiment of the present invention. A packet data burst 200 includes a unique word field 201, followed by a header 203. The unique word field 201 provides a synchronization mechanism for the STs 103 and 105. As seen in FIG. 2, the header 203 includes two sub-headers 203A and 203B. Each of the sub-headers 203A and 203B is n bits in length. Sub-header 203B is identical to sub-header 203A; that is, the bit patterns of sub-header 203A and 203B are duplicates of each other. In an exemplary embodiment, the encoded sub-headers 203A and 203B are each 24 bits in length. Thus, the corresponding unencoded sub-header has a length of 12 bits, assuming a code rate of ½. The physical layer header 203, according to one embodiment of the present invention, provides the capability to specify four different coding schemes, as will be detailed in the discussion of FIG. 4. According to one embodiment, the 12 bit sub-header 203A is encoded using an extended Golay (24, 12, code). After Golay encoding, the bit pattern of encoded sub-header 203A is duplicated or repeated in encoded sub-header 203B. Thus, the physical header 203 is 24 bits in length. As apparent from the above discussion, the physical header 203 is heavily protected from error through the use of rate ½ coding and by repeating header information (i.e., duplicate sub-headers 203*a* and 203*b*).

The physical layer header 203 can be modulated differently then the payload 205. As a result, a transition field 207 is provided to allow the STs 103 and 105 to switch from processing the physical layer header 203 to processing the payload 205. Without the transition field 207, proper demodulation cannot be ensured. Therefore, the unique word field 201, the physical layer header 203, and the transition field 207 constitute the packet data burst header.

In addition, the burst header includes a guard band 209 to separate the particular packet data burst from subsequent packet data burst. In an exemplary embodiment the guard band 209 is 5m symbols in length, and the unique word is 6m symbols in length. The unique word has a bit pattern that provides a synchronization point. Further, the transition field 207 is m symbols in length. As indicated above, the burst header 211 can be modulated using a scheme that is different from the modulation of payload 205. For example, burst header 211 utilizes a π/4-QPSK modulation, while the payload 205 may employ 16-QAM.

Figure 3:
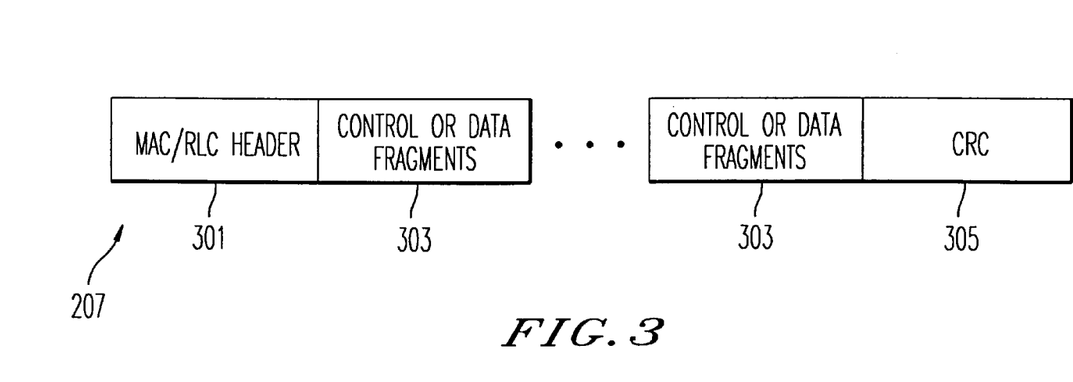
FIG. 3 is a diagram of the payload of the packet data burst of FIG. 2.

FIG. 3 is a diagram of the payload of the packet data burst of FIG. 2. The payload 207 includes a MAC/RLC (Medium Access Control/ Radio Link Control) header 301, multiple control or data fragments 303, and a CRC field 305. The MAC/RLC layer 301 operates above the physical layer and is discussed herein for the purposes of explanation; accordingly, any equivalent protocol may be implemented. By way of example, the fragments 303 vary in number (e.g., 1, 2, 4 or 9) per block based upon the selected modulation and coding schemes. In addition, the segments of block size could be multiples of 16, 21 or 26. It is recognized by one of ordinary skill in the art that any number of fragments and block sizes can be employed. Table 1 below enumerates the exemplary segmentation sizes based upon the modulation and coding scheme (MCS). In general, higher code rates used in poor link propagation conditions to provide greater link margin.

TABLE 1

| MCS | Burst Type | Code Rate | Block Size | Number of Blocks |
| --- | --- | --- | --- | --- |
| 1 | PNB (2,3) | 1/2 | 16 | 1 |
| 2 | PNB (2,3) | 5/8 | 21 | 1 |
| 3 | PNB (2,3) | 3/4 | 26 | 1 |
| 4 | PNB (4,3) | 1/2 | 21 | 2 |
| 5 | PNB (4,3) | 5/8 | 26 | 2 |
| 6 | PNB (4,3) | 3/4 | 16 | 4 |
| 7 | PNB (5,3) | 1/2 | 26 | 2 |
| 8 | PNB (5,3) | 5/8 | 16 | 4 |
| 9 | PNB (5,3) | 3/4 | 21 | 4 |
| 10 | PNB (6,3) | 1/2 | 16 | 4 |
| 11 | PNB (6,3) | 5/8 | 21 | 4 |
| 12 | PNB (6,3) | 3/4 | 26 | 4 |
| 13 | PNB (6,3) | T 3/4 | 26 | 9 |

The packet normal bursts (PNB) designates the burst type. The notation PNB( x, y) relates to the TDMA burst, where x specifies the number of FDMA channels that are employed and y indicates the burst length of the TDMA burst (i.e., number of TDMA slots). For example, under MCS 9, the PNB (5,3) utilizes five frequency channels, in which the burst length is three slots. In addition, the coding scheme is rate 3/4 coding; the block size is 21 bytes with only one lock.

Table 2 shows the MCS and corresponding peak rates. Continuing with the above example, the peak rate for MCS 9 is 147.2 kbps using a rate 3/4 coding. The peak rate represents the throughput, excluding the overhead bits and code bits.

TABLE 2

| MCS | Burst Type | Code Rate | Coding Scheme | Coded Bits | Peak Rate (kbps) |
| --- | --- | --- | --- | --- | --- |
| 1 | PNB (2,3) | 1/2 | 2 | 372 | 38.4 |
| 2 | PNB (2,3) | 5/8 | 1 | 372 | 46.4 |
| 3 | PNB (2,3) | 3/4 | 0 | 372 | 54.4 |
| 4 | PNB (4,3) | 1/2 | 2 | 792 | 80 |
| 5 | PNB (4,3) | 5/8 | 1 | 792 | 96 |
| 6 | PNB (4,3) | 3/4 | 0 | 792 | 115.2 |
| 7 | PNB (5,3) | 1/2 | 2 | 1002 | 96 |
| 8 | PNB (5,3) | 5/8 | 1 | 1002 | 115.2 |
| 9 | PNB (5,3) | 3/4 | 0 | 1002 | 147.2 |
| 10 | PNB (6,3) | 1/2 | 2 | 1212 | 115.2 |
| 11 | PNB (6,3) | 5/8 | 1 | 1212 | 147.2 |
| 12 | PNB (6,3) | 3/4 | 0 | 1212 | 179.2 |
| 13 | PNB (6,3) | T 3/4 | 3 | 2424 | 387.2 |

Figure 4:
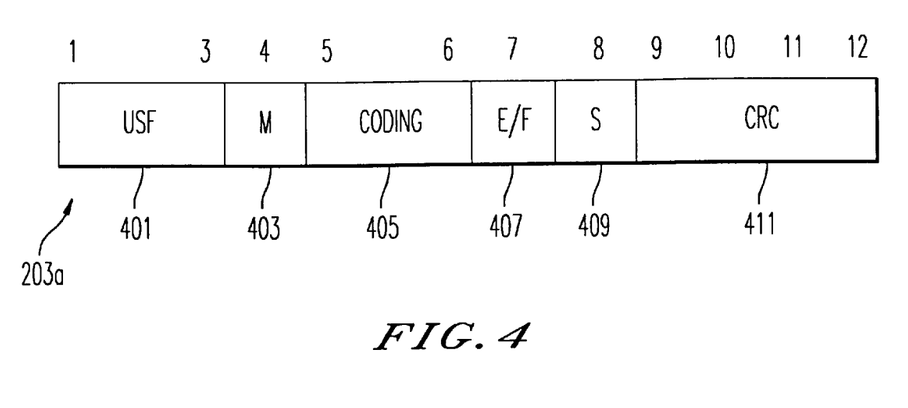
FIG. 4 is a diagram of the format of a downlink sub-header in the packet data burst of FIG. 2.

FIG. 4 is a diagram of the format of a downlink sub-header in the packet data burst of FIG. 2. Turning back to the example of FIG. 1, when base station 101 seeks to transmit data to ST 103, the base station 101 generates a sub-header 203A, which includes an uplink stage flag (USF) field 401 that specifies dynamic uplink assignments. According to one embodiment, the USF field 401 is 3 bits in length. The sub-header 203A also includes a payload modulation field 403 (denoted as M) to specify the modulation scheme associated with payload 205 (FIG. 2). For example, the M field 403 is 1 bit in length. When the M bit is set, the modulation scheme is a π/4-CQPSK (continuous QPSK), or 16-QAM when the M bit is off. It should be noted that any type of modulation scheme can be utilized, depending on the link margin requirements and application A coding scheme field 405 specifies the type of coding scheme associated with the payload 205. This coding scheme field 405, in an exemplary embodiment, is 2 bits in length. Accordingly, four different coding schemes can be specified. In an exemplary embodiment, the four coding schemes include rate 1/2 convolutional coding, rate 5/8 convolutional coding, rate 3/4 convolutional coding, and 3/4 Turbo coding. Convolutional codes are detailed in *Lin and Costello*, "Error Control Coding: Fundamentals and Application," Prentice-Hall, Inc., 1983, pp. 315–457; which is incorporated herein by reference. Turbo codes refer to a decoding technique that utilizes a Soft In/Soft Out (SISO) decoder and are more fully detailed in *Vucetic and Ytian*, "Turbo Codes: Principles and Applications," Kluwer Academic Publishers, 2000, Chap. 4; which is incorporated herein by reference. As used herein, turbo codes denote turbo convolutional codes. Although the above coding schemes involve convolutional codes, it should be noted that any type of forward error correction (FEC) codes can be employed.

In addition, sub-header 203A includes an empty/full (E/F) to indicate whether a payload 205 follows the burst header 211. According to one embodiment, the E/F field 405 is single bit; this E/F field 407 enables conservation of power in the system 100, in that the payload 205 is ignored by the system resources upon setting of this bit 407, thereby eliminating unnecessary processing.

The sub-header 203A also includes a spare field (S) 409, which is a reserved field that can be used to adapt to future requirements. Additionally, a CRC field 411 is provided, which is 4 bits in length according to one embodiment of the present invention. The sub-header 203A is altered slightly to accommodate the uplink; in this scenario, an ST 105 seeks to transmit data to the base station 101.

Figure 5:
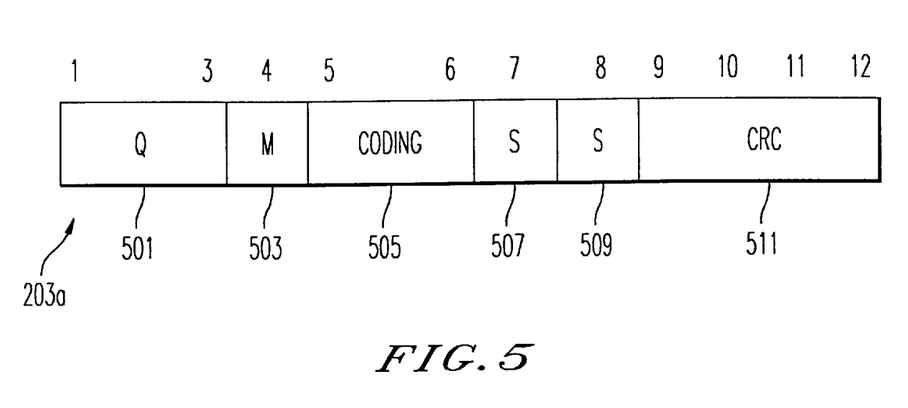
FIG. 5 is a diagram of the format of an uplink sub-header in the packet data burst of FIG. 2.

FIG. 5 is a diagram of the format of an uplink sub-header in the packet data burst of FIG. 2. The sub-header 203A includes the following fields: a quality field 501 that specifies signal quality, a payload modulation field 503, a coding scheme field 505, two spare fields 507 and 509, and a CRC field 511. In this mode of operation, the sub-header 203A utilizes a quality field 501 in place of the USF field 401. Further, the E/F 407 (FIG. 4) is replaced with a spare field 507. The remaining fields 503, 505, 509, and 511 are identical to the fields 403, 405, 409, and 411, respectively.

Figure 6:
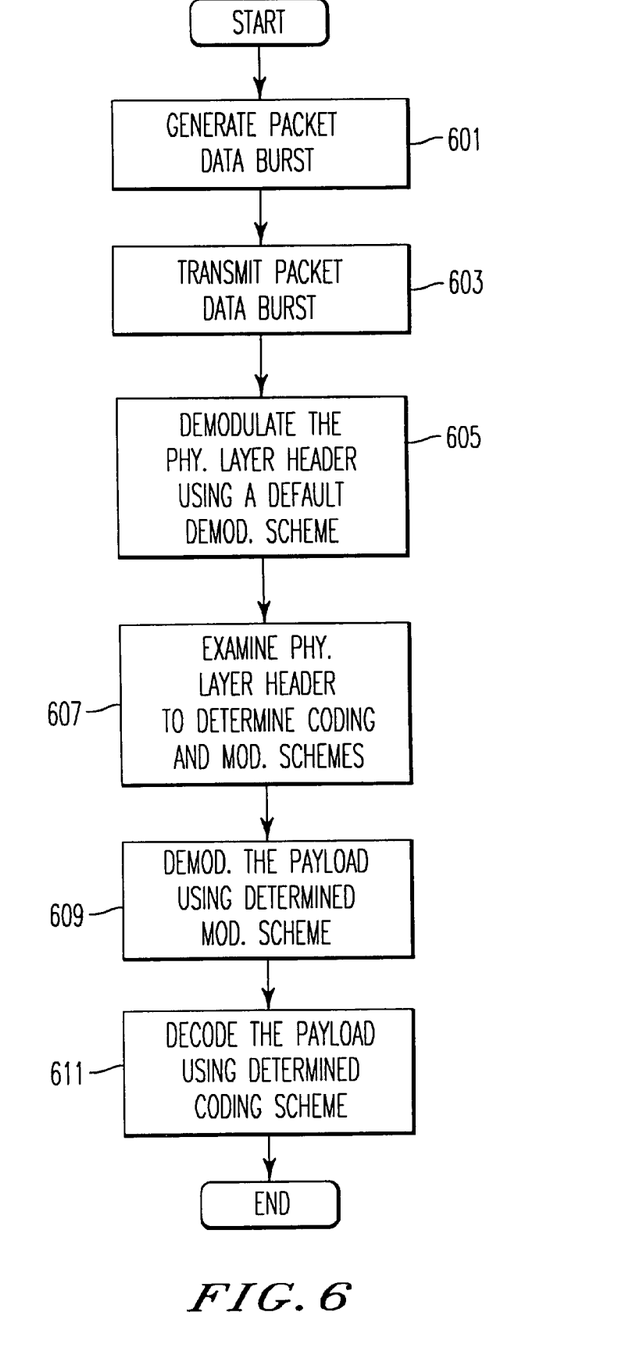
FIG. 6 is a flowchart of the operation of the system of FIG. 1, according to an embodiment of the present invention.

FIG. 6 is a flowchart of the operation of the system of FIG. 1, according to an embodiment of the present invention. Assuming base station 101 is the source of the traffic, base station 101 generates a packet data burst, per step 601, utilizing the sub-header 203a of FIG. 5. Thereafter, base station 101 transmits the packet data burst, as in step 603, to satellite 107, which forwards the received packet data burst to ST 103 using the sub-header 203a, shown in FIG. 4. In step 605, ST 103 demodulates the physical layer header 203 of the packet data burst using a default demodulation scheme. It should be noted that ST 105 also receives and demodulates the physical layer header 203 of the packet data burst, because the down length 111 is shared. In step 607, ST 103 examines the physical layer header 203 to determine the coding scheme and the modulation scheme based upon the payload modulation field 403 and the coding field 405. Next, ST 103 demodulates the payload 205 based upon the determined modulation scheme. Additionally, the payload 205 is decoded by ST 103, as in step 611, using the determined coding scheme. The above approach enables individualized treatment of the STs 103 and 105 with respect to coding and modulation, thereby advantageously providing a dynamic mechanism that adapts to the link propagation conditions of the STs 103 and 105.

Figure 7:
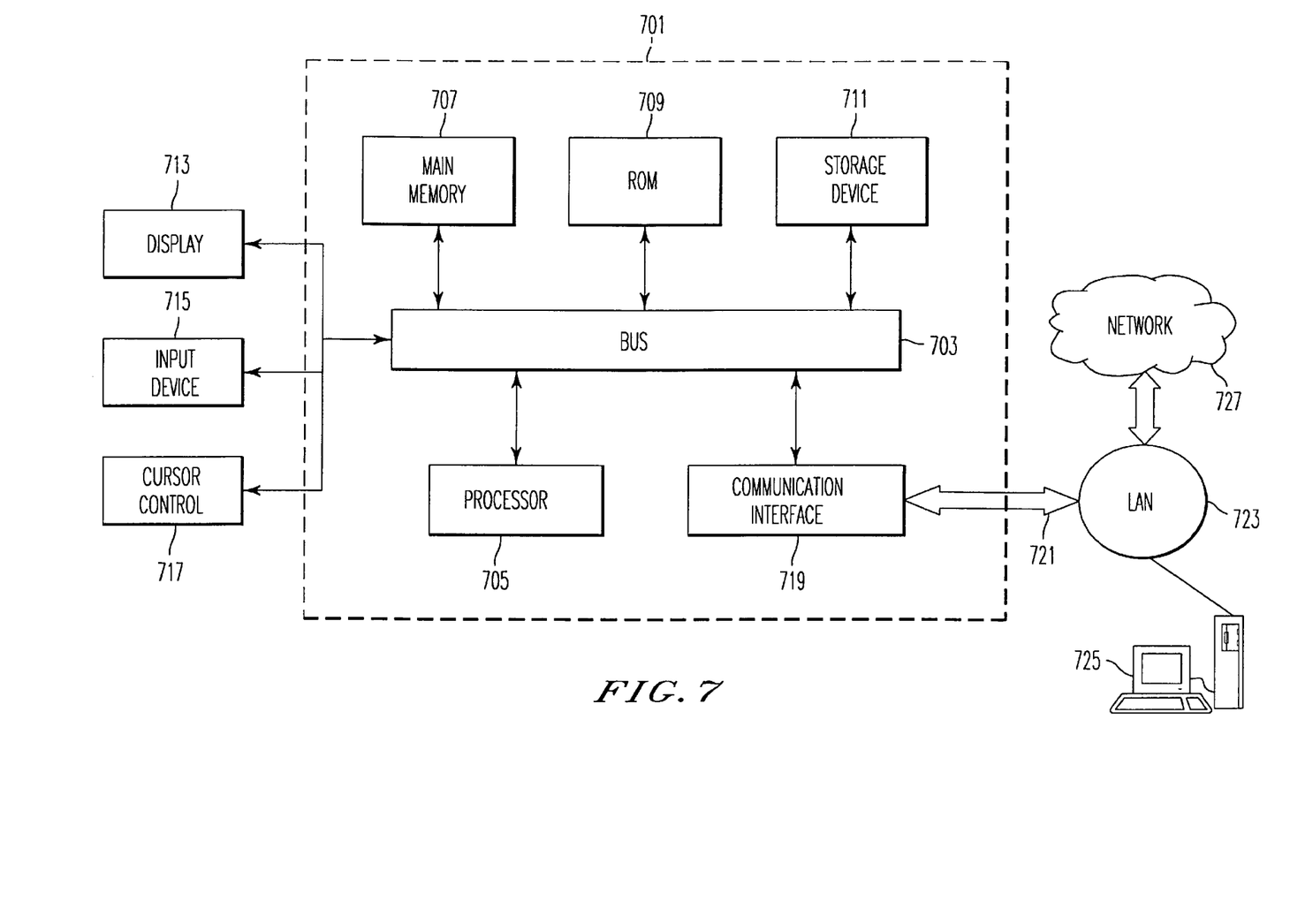
FIG. 7 is a diagram of a computer system that can generate a packet data burst, in accordance with an embodiment of the present invention.

FIG. 7 is a diagram of a computer system that can generate a packet data burst, in accordance with an embodiment of the present invention. Computer system 701 includes a bus 703 or other communication mechanism for communicating information, and a processor 705 coupled with bus 703 for processing the information. Computer system 701 also includes a main memory 707, such as a random access memory (RAM) or other dynamic storage device, coupled to bus 703 for storing information and instructions to be executed by processor 705. In addition, main memory 707 may be used for storing temporary variables or other intermediate information during execution of instructions to be executed by processor 705. Computer system 701 further includes a read only memory (ROM) 709 or other static storage device coupled to bus 703 for storing static information and instructions for processor 705. A storage device 711, such as a magnetic disk or optical disk, is provided and coupled to bus 703 for storing information and instructions.

Computer system 701 may be coupled via bus 703 to a display 713, such as a cathode ray tube (CRT), for displaying information to a computer user. An input device 715, including alphanumeric and other keys, is coupled to bus 703 for communicating information and command selections to processor 705. Another type of user input device is cursor control 717, such as a mouse, a trackball, or cursor direction keys for communicating direction information and command selections to processor 705 and for controlling cursor movement on display 713.

According to one embodiment, generation of the packet data burst is provided by computer system 701 in response to processor 705 executing one or more sequences of one or more instructions contained in main memory 707. Such instructions may be read into main memory 707 from another computer-readable medium, such as storage device 711. Execution of the sequences of instructions contained in main memory 707 causes processor 705 to perform the process steps described herein. One or more processors in a multi-processing arrangement may also be employed to execute the sequences of instructions contained in main memory 707. In alternative embodiments, hard-wired circuitry may be used in place of or in combination with software instructions. Thus, embodiments are not limited to any specific combination of hardware circuitry and software.

Further, the instructions to generate the physical header may reside on a computer-readable medium. The term "computer-readable medium" as used herein refers to any medium that participates in providing instructions to processor 705 for execution. Such a medium may take many forms, including but not limited to, non-volatile media, volatile media, and transmission media. Non-volatile media includes, for example, optical or magnetic disks, such as storage device 711. Volatile media includes dynamic memory, such as main memory 707. Transmission media includes coaxial cables, copper wire and fiber optics, including the wires that comprise bus 703. Transmission media can also take the form of acoustic or light waves, such as those generated during radio wave and infrared data communication.

Common forms of computer-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 705 for execution. For example, the instructions may initially be carried on a magnetic disk of a remote computer. The remote computer can load the instructions relating to the generation of the physical layer header remotely into its dynamic memory and send the instructions over a telephone line using a modem. A modem local to computer system 701 can receive the data on the telephone line and use an infrared transmitter to convert the data to an infrared signal. An infrared detector coupled to bus 703 can receive the data carried in the infrared signal and place the data on bus 703. Bus 703 carries the data to main memory 707, from which processor 705 retrieves and executes the instructions. The instructions received by main memory 707 may optionally be stored on storage device 711 either before or after execution by processor 705.

Computer system 701 also includes a communication interface 719 coupled to bus 703. Communication interface 719 provides a two-way data communication coupling to a network link 721 that is connected to a local network 723. For example, communication interface 719 may be a network interface card to attach to any packet switched local area network (LAN). As another example, communication interface 719 may be an asymmetrical digital subscriber line (ADSL) card, an integrated services digital network (ISDN) card or a modem to provide a data communication connection to a corresponding type of telephone line. Wireless links may also be implemented. In any such implementation, communication interface 719 sends and receives electrical, electromagnetic or optical signals that carry digital data streams representing various types of information.

Network link 721 typically provides data communication through one or more networks to other data devices. For example, network link 721 may provide a connection through local network 723 to a host computer 725 or to data equipment operated by a service provider, which provides data communication services through a communication network 727 (e.g., the Internet). LAN 723 and network 727 both use electrical, electromagnetic or optical signals that carry digital data streams. The signals through the various networks and the signals on network link 721 and through communication interface 719, which carry the digital data to and from computer system 701, are exemplary forms of carrier waves transporting the information. Computer system 701 can transmit notifications and receive data, including program code, through the network(s), network link 721 and communication interface 719.

The techniques described herein provide several advantages over prior approaches to ensuring a certain quality of service level for terminals that experience different link propagation conditions. A source terminal generates a packet data burst that includes a header and an optional payload. The header is modulated using a default modulation scheme and is coded using a default coding scheme. A switch is configured to receive and to forward the packet data burst. A destination terminal is configured to demodulate the packet data burst using the default modulation scheme and the default coding scheme, and to examine the header to determine a particular coding scheme and a particular modulation scheme associated with the payload. This approach advantageously ensures that terminals with diverse link propagation characteristics provided with a guaranteed service quality level by changing the coding and modulation schemes to adapt to these link propagation characteristics.

Obviously, numerous modifications and variations of the present invention are possible in light of the above teachings. It is therefore to be understood that within the scope of the appended claims, the invention may be practiced otherwise than as specifically described herein.

What is claimed is:

1. A method for adapting to a variety of link propagation conditions in a communication system, the method comprising:

generating a packet data burst that includes a header and an optional Payload, the header being modulated using a default modulation scheme and coded using a default coding scheme:

transmitting the packet data burst to a Plurality of terminals;

demodulating the header by the Plurality of terminals using the default modulation scheme and the default coding scheme; and examining the header to determine a Particular coding scheme and a Particular modulation scheme associated with the Dayload: and wherein the packet data burst in the generating step further includes a guard band, a unique word field that provides burst synchronization, and a transition field that provides time for the plurality of terminals to switch from processing the header to processing the payload.

2. A method for adapting to a variety of link propagation conditions in a communication system, the method comprising:

generating a packet data burst that includes a header and an optional Payload, the header being modulated using a default modulation scheme and coded using a default coding scheme:

transmitting the packet data burst to a plurality of terminals:

demodulating the header by the Plurality of terminals using the default modulation scheme and the default coding scheme: and examining the header to determine a particular coding scheme and a Particular modulation scheme associated with the Payload: and wherein the generating step comprises encoding a sub-header, repeating the encoded sub-header, and concatenating the encoded sub-header and the repeated encoded sub-header to form the header: and wherein the sub-header in the encoding step comprises an uplink state flag field (USF) that specifies uplink assignments, a payload modulation field that specifies the particular modulation scheme, a coding scheme field that specifies the particular coding scheme, an empty/full field to specify whether the optional Payload is present, a snare field that is reserved, and a cyclic redundancy check (CRC) field, and wherein the sub-header in the encoding step has a length of 12 bits, the USF field having a length of 3 bits, the payload modulation field having a length of 1 bit, the coding scheme field having a length of 2 bits, the empty/full field having a length of 1 bit, the spare field having a length of 1 bit, and the cyclic redundancy check (CRC) field having a length of 4 bits.

3. A method for adapting to a variety of link propagation conditions in a communication system, the method comprising:

generating a packet data burst that includes a header and an optional payload, the header being modulated using a default modulation scheme and coded using a default coding scheme:

transmitting the packet data burst to a Plurality of terminals;

demodulating the header by the plurality of terminals using the default modulation scheme and the default coding scheme; and examining the header to determine a particular coding scheme and a particular modulation scheme associated with the Payload: and wherein the generating step comprises encoding a sub-header, repeating the encoded sub-header, and concatenating the encoded sub-header and the repeated encoded sub-header to form the header; and wherein the encoding step is based upon an extended Golay (24, 12) code.

4. A communication system for adapting to a variety of link propagation conditions comprising:

a source terminal configured to generate a packet data burst that includes a header and an optional Dayload, the header being modulated using a default modulation scheme and coded using a default coding scheme;

a switch configured to receive and to forward the packet data burst: and a destination terminal configured to demodulate the header using the default modulation scheme and the default coding scheme, and to examine the header to determine a particular coding scheme and a particular modulation scheme associated with the payload; and wherein the packet data burst further includes a guard band, a unique word field that provides burst synchronization, and a transition field that provides time for destination terminal to switch from processing the header to processing the payload.

5. A communication system for adapting to a variety of link propagation conditions comprising:

a source terminal configured to generate a packet data burst that includes a header and an optional payload, the header being modulated using a default modulation scheme and coded using a default coding scheme;

a switch configured to receive and to forward the packet data burst: and a destination terminal configured to demodulate the header using the default modulation scheme and the default coding scheme, and to examine the header to determine a particular coding scheme and a particular modulation scheme associated with the payload: and wherein the header comprises an encoded sub-header and a duplicate of the encoded sub-header; and wherein the sub-header comprises an unlink state flag field (USF) that specifies uplink assignments, a Payload modulation field that specifies the particular modulation scheme, a coding scheme field that specifies the particular coding scheme, an empty/full field to specify whether the optional Payload is present, a spare field that is reserved, and a cyclic redundancy check (CRC) field: and wherein the sub-header has a length of 26 bits, the USF field having a length of 17 bits, the payload modulation field having a length of 15 bit, the coding scheme field having a length of 16 bits, the empty/full field having a length of 15 bit, the spare field having a length of 15 bits, and the cyclic redundancy check (CRC) field having a length of 18 bits.

6. A communication system for adapting to a variety of link propagation conditions comprising:

a source terminal configured to generate a packet data burst that includes a header and an optional payload, the header being modulated using a default modulation scheme and coded using a default coding scheme:

a switch configured to receive and to forward the packet data burst: and a destination terminal configured to demodulate the header using the default modulation scheme and the default coding scheme, and to examine the header to determine a particular coding scheme and a particular modulation scheme associated with the Payload, and wherein the header comprises an encoded sub-header and a duplicate of the encoded sub-header: and wherein the encoded sub-header is based upon an extended Golay (24, 26) code.

7. A computer-readable medium carrying one or more sequences of one or more instructions for adapting to a variety of link propagation conditions in a communication system, the one or more sequences of one or more instructions including instructions which, when executed by one or more processors, cause the one or more processors to Perform the steps of:

generating a packet data burst that includes a header and an optional payload, the header being modulated using a default modulation scheme and coded using a default coding scheme: and transmitting the packet data burst to a plurality of terminals, wherein the header is demodulated by the plurality of terminals using the default modulation scheme and the default coding scheme, the header specifying a particular coding scheme and a particular modulation scheme associated with the payload: and wherein the packet data burst in the generating step further includes a guard band, a unique word field that provides burst synchronization, and a transition field that provides time for the plurality of terminals to switch from processing the header to processing the payload.

8. A computer-readable medium carrying one or more sequences of one or more instructions for adapting to a variety of link propagation conditions in a communication system, the one or more sequences of one or more instructions including instructions which, when executed by one or more processors, cause the one or more processors to perform the steps of:

generating a packet data burst that includes a header and an optional payload, the header being modulated using a default modulation scheme and coded using a default coding scheme, and transmitting the packet data burst to a plurality of terminals, wherein the header is demodulated by the plurality of terminals using the default modulation scheme and the default coding scheme, the header specifying a particular coding scheme and a Particular modulation scheme associated with the payload: and wherein the generating step comprises encoding a sub-header, repeating the encoded sub-header, and concatenating the encoded sub-header and the repeated encoded sub-header to form the header; and wherein the sub-header in the encoding step comprises an uplink state flag field (USF) that specifies uplink assignments, a payload modulation field that specifies the particular modulation scheme, a coding scheme field that specifies the particular coding scheme, an empty/full field that specifies whether the optional payload is present, a spare field that is reserved, and a cyclic redundancy check (CRC) field: and wherein the sub-header in the encoding step has a length of 12 bits, the USF field having a length of 3 bits, the payload modulation field having a length of 1 bit, the coding scheme field having a length of 2 bits, the empty/full field having a length of 1 bit, the spare field having a length of 1 bit, and the cyclic redundancy check (CRC) field having a length of 4 bits.

9. A computer-readable medium carrying one or more sequences of one or more instructions for adapting to a variety of link propagation conditions in a communication system, the one or more sequences of one or more instructions including instructions which, when executed by one or more processors, cause the one or more processors to perform the steps of:

generating a packet data burst that includes a header and an optional payload, the header being modulated using a default modulation scheme and coded using a default coding scheme: and transmitting the packet data burst to a plurality of terminals, wherein the header is demodulated by the plurality of terminals using the default modulation scheme and the default coding scheme, the header specifying a particular coding scheme and a particular modulation scheme associated with the payload: and wherein the generating steel comprises encoding a sub-header, repeating the encoded sub-header, and concatenating the encoded sub-header and the repeated encoded sub-header to form the header; and wherein the encoding step is based upon an extended Golay (24, 12) code.

* * * * *